United States Patent
Kawashima

(10) Patent No.: US 10,421,340 B2
(45) Date of Patent: Sep. 24, 2019

(54) VEHICLE SUN VISOR

(71) Applicant: Yazaki Corporation, Tokyo (JP)

(72) Inventor: Kenichi Kawashima, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/007,357

(22) Filed: Jun. 13, 2018

(65) Prior Publication Data

US 2018/0361835 A1 Dec. 20, 2018

(30) Foreign Application Priority Data

Jun. 20, 2017 (JP) .................................. 2017-120273

(51) Int. Cl.
- *B60J 3/02* (2006.01)
- *B60Q 3/252* (2017.01)
- *B60R 16/03* (2006.01)

(52) U.S. Cl.
CPC ........... *B60J 3/0217* (2013.01); *B60J 3/0221* (2013.01); *B60Q 3/252* (2017.02); *B60R 16/03* (2013.01)

(58) Field of Classification Search
CPC ...... B60J 3/0217; B60J 3/0221; B60J 3/0252; B60Q 3/252
USPC ........................................... 296/97.12, 97.13
See application file for complete search history.

(56) References Cited

U.S. PATENT DOCUMENTS

| | | | | |
|---|---|---|---|---|
| 6,139,083 | A * | 10/2000 | Fischer | B60J 3/0239 296/97.11 |
| 2002/0094719 | A1* | 7/2002 | Sawayanagi | B60J 3/0221 439/545 |
| 2002/0149224 | A1* | 10/2002 | Wilson | B60J 3/0217 296/97.5 |
| 2005/0104409 | A1* | 5/2005 | Garcia | B60J 3/0221 296/97.9 |
| 2011/0260491 | A1 | 10/2011 | Ebisuoka | |
| 2017/0021702 | A1* | 1/2017 | Jin | B60J 3/0221 |
| 2018/0361834 | A1* | 12/2018 | Nishiyama | B60J 3/0217 |
| 2018/0361836 | A1* | 12/2018 | Nishiyama | B60J 3/0217 |
| 2018/0370341 | A1* | 12/2018 | Shimizu | B60J 3/0217 |
| 2019/0061485 | A1* | 2/2019 | Nishiyama | B60J 3/0217 |

FOREIGN PATENT DOCUMENTS

JP 2011-230559 A 11/2011

* cited by examiner

*Primary Examiner* — Jason S Morrow

(74) *Attorney, Agent, or Firm* — Sughrue Mion, PLLC

(57) ABSTRACT

A vehicle sun visor has a sun-visor body including an illumination lamp, a non-conductive arm including a cylindrical-end portion with contact parts of a pair of conductors rotatably holding the sun visor body, a mounting bracket for mounting the arm to a vehicle, and a connector detachably attached to the mounting bracket and including a pair of terminals each having a contact portion to contact with a corresponding contact part of the pair of conductors. An arm-supporting portion of the mounting bracket rotatably supports a cylindrical-end-portion side of the arm. The contact parts of the pair of conductors are in arcuate-plate shape and provided with a cutout on an outer-peripheral surface of the cylindrical-end portion exposed outside the arm-supporting portion. A terminal-fixing portion provided in a housing of the connector fix a base portion of each contact portion, and a terminal-support portion supports a free end of each contact portion.

2 Claims, 11 Drawing Sheets

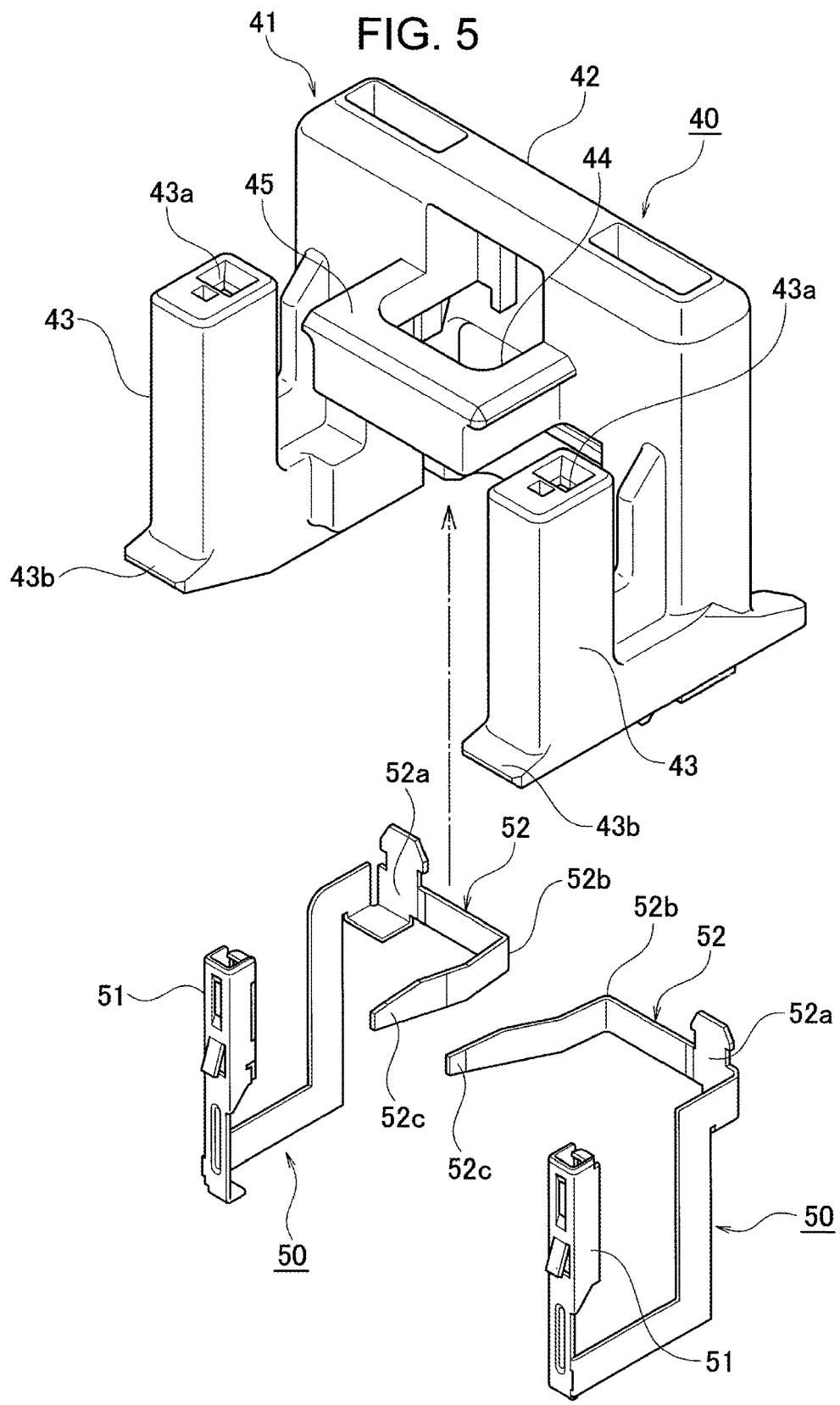

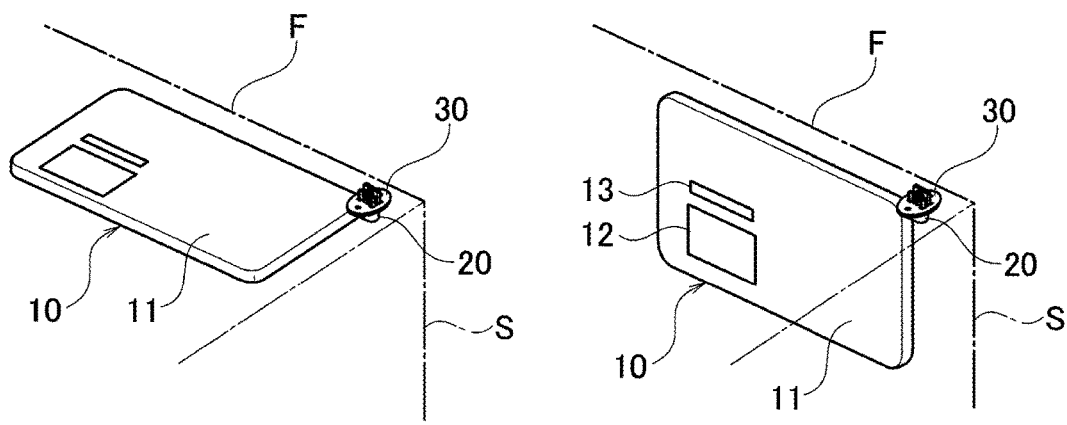
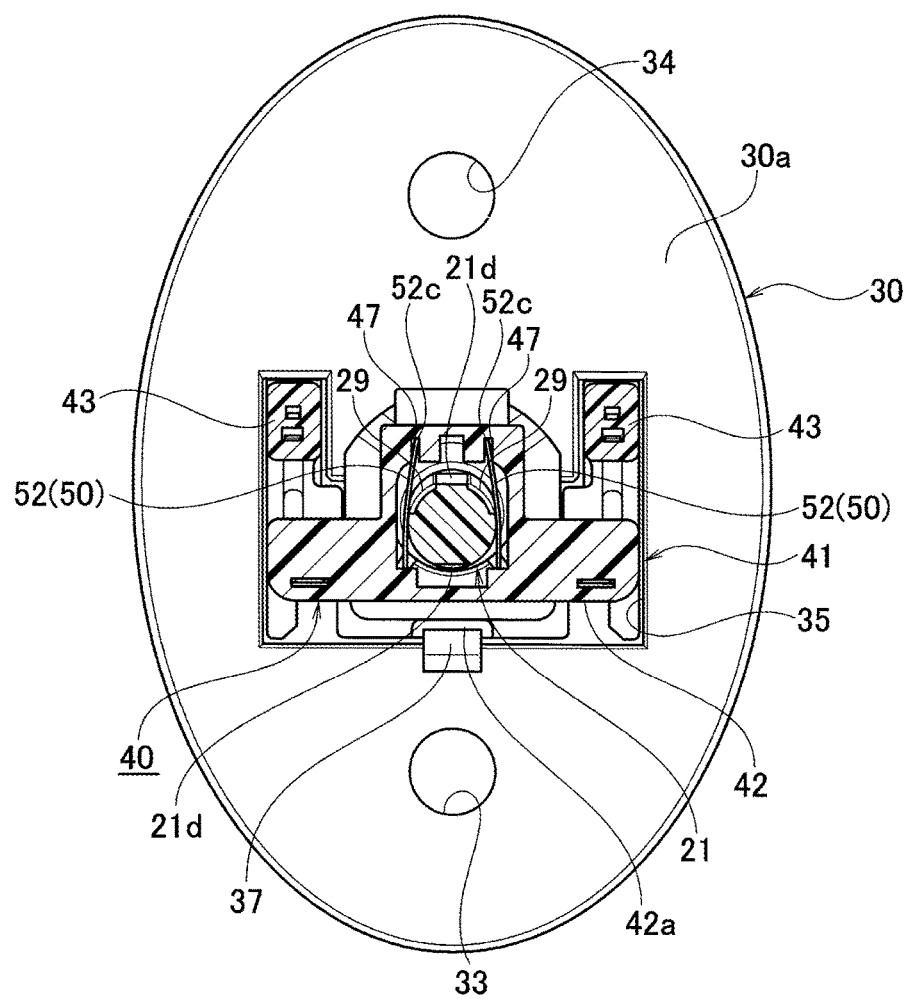

VEHICLE SUN VISOR

CROSS REFERENCE TO RELATED APPLICATIONS

This application claims the priority of Japanese Patent Application No. 2017-120273, filed on Jun. 20, 2017, the entire content of which are incorporated herein by reference.

BACKGROUND

Technical Field

The present invention relates to a vehicle sun visor with illumination arranged in the vicinity of an upper end of a front window of a front seat of a vehicle.

Related Art

A vehicle sun visor of this type is disclosed in JP 2011-230559 A. As shown in FIG. 11, the vehicle sun visor 1 includes a non-conductive support shaft (arm) 2 for rotatably holding a sun visor body (not shown), a mounting bracket 5 for mounting the support shaft 2 to a ceiling of a vehicle cabin (not shown), and a connector 7 detachably assembled to the mounting bracket 5 and having a pair of terminals 8 and 8 for supplying electric power.

A pair of conductors 3 and 3 extending in parallel is arranged inside the support shaft 2. Each columnar conductor end portion 3a serving as the contact parts of a pair of conductors 3 and 3 is provided on the closed upper surface of an end portion 2a toward the mounting bracket 5 so as to protrude outward. The pair of columnar conductor end portions 3a and 3a is spaced apart from each other, having a space, via a non-conductive intervening portion 2b protruding to the center of the upper surface of the end portion 2a of the support shaft 2.

The end portion 2a of the support shaft 2 is rotatably supported by a cylindrical support protrusion portion 5a of the mounting bracket 5, and a housing 7a of the connector 7 is assembled to a mounting recess portion 5b of the mounting bracket 5.

When the support shaft 2 is rotated to a first position, the pair of columnar conductor end portions 3a and 3a protruding outward from the end portion 2a contacts each plate-shaped spring portion 8a as contact parts of the pair of terminals 8 and 8 for supplying electric power to be brought into an energized (ON) state, whereby a lighting preparation state of the illumination lamp of the sun visor body is formed.

When the support shaft 2 is rotated to the second position, the pair of columnar conductor end portions 3a and 3a protruding outward from the end portion 2a is away from each spring portion 8a of the pair of terminals 8 and 8 for supplying electric power to be in a non-conducting (OFF) state.

SUMMARY

However, in the conventional vehicle sun visor 1, when assembling the housing 7a of the connector 7 to the mounting recess portion 5b of the mounting bracket 5 to which the support shaft 2 is assembled, unless the support shaft 2 is in a correct position, a plate-shaped spring portion 8a of the terminal 8 may be deformed due to the interference of the columnar conductor end portion 3a, resulting in a possible conduction failure.

In addition, since the plate-shaped spring portion 8a of the terminal 8 contacting the columnar conductor end portion 3a of the support shaft 2 has a free end at its distal end, a required contact load cannot be obtained even when the columnar conductor end portion 3a of the support shaft 2 comes into contact with the spring portion 8a of the terminal 8, and the columnar conductor end portion 3a of the support shaft 2 and the spring portion 8a of the terminal 8 may be temporarily away from each other due to vibrations or the like during running of the vehicle. Thus, the illumination lamp may flicker at the time of lighting.

The present invention has been made to solve the above-mentioned problems, and it is an object of the present invention to provide a vehicle sun visor capable of preventing an elastically deforming contact part (spring portion) of a terminal from deforming due to interference between the contact part of the terminal and a contact part of a conductor of an arm, and preventing a illumination lamp from flickering at the time of lighting.

A vehicle sun visor according to an aspect of the present invention has a sun visor body including an illumination lamp, a non-conductive arm including a cylindrical-end portion on which contact parts of a pair of conductors are arranged and rotatably holding the sun visor body, a mounting bracket configured to mount the non-conductive arm to a vehicle, and a connector detachably attached to the mounting bracket and including a pair of terminals each having a contact portion to contact with a corresponding contact part of the pair of conductors and configured to supply electric power. The mounting bracket includes an arm-supporting portion rotatably supporting a cylindrical-end-portion side of the non-conductive arm. The contact parts of the pair of conductors are formed in an arcuate-plate shape. The pair of arcuate-plate shape contact parts is provided with a cutout on an outer peripheral surface of the cylindrical-end portion exposed outside the arm-supporting portion of the non-conductive arm. A terminal-fixing portion configured to fix a base portion of each contact portion of the pair of terminals is provided in a housing of the connector, and a terminal-support portion for supporting a free end of each contact portion is provided.

When the pair of terminals is assembled to the connector, the terminal-support portion of the housing may support the free end of each contact portion of the pair of terminals with a load applied in advance.

According to the present invention, the terminal-fixing portion for fixing the base portion of each of elastically deforming contact parts of the pair of terminals is provided in the housing of the connector, and the terminal-support portion for supporting a free end of each contact part is provided, so that it is possible to prevent the spring portion of the terminal from deforming due to interference between the contact part of the terminal and the contact part of the conductor of the arm, and prevent the illumination lamp from flickering at the time of lighting.

BRIEF DESCRIPTION OF DRAWINGS

FIG. 5 is a perspective view showing a state before a pair of terminals is inserted into a housing of a connector of the vehicle sun visor;

FIG. 9A is a perspective view showing a state in which the vehicle sun visor is stored toward a ceiling of a cabin;

FIG. 9B is a perspective view showing a state in which the vehicle sun visor is folded down in front of a front window;

FIG. 9C is a plan cross-sectional view of a principal part of the vehicle sun visor in each of the above states;

DETAILED DESCRIPTION

Figure 1:
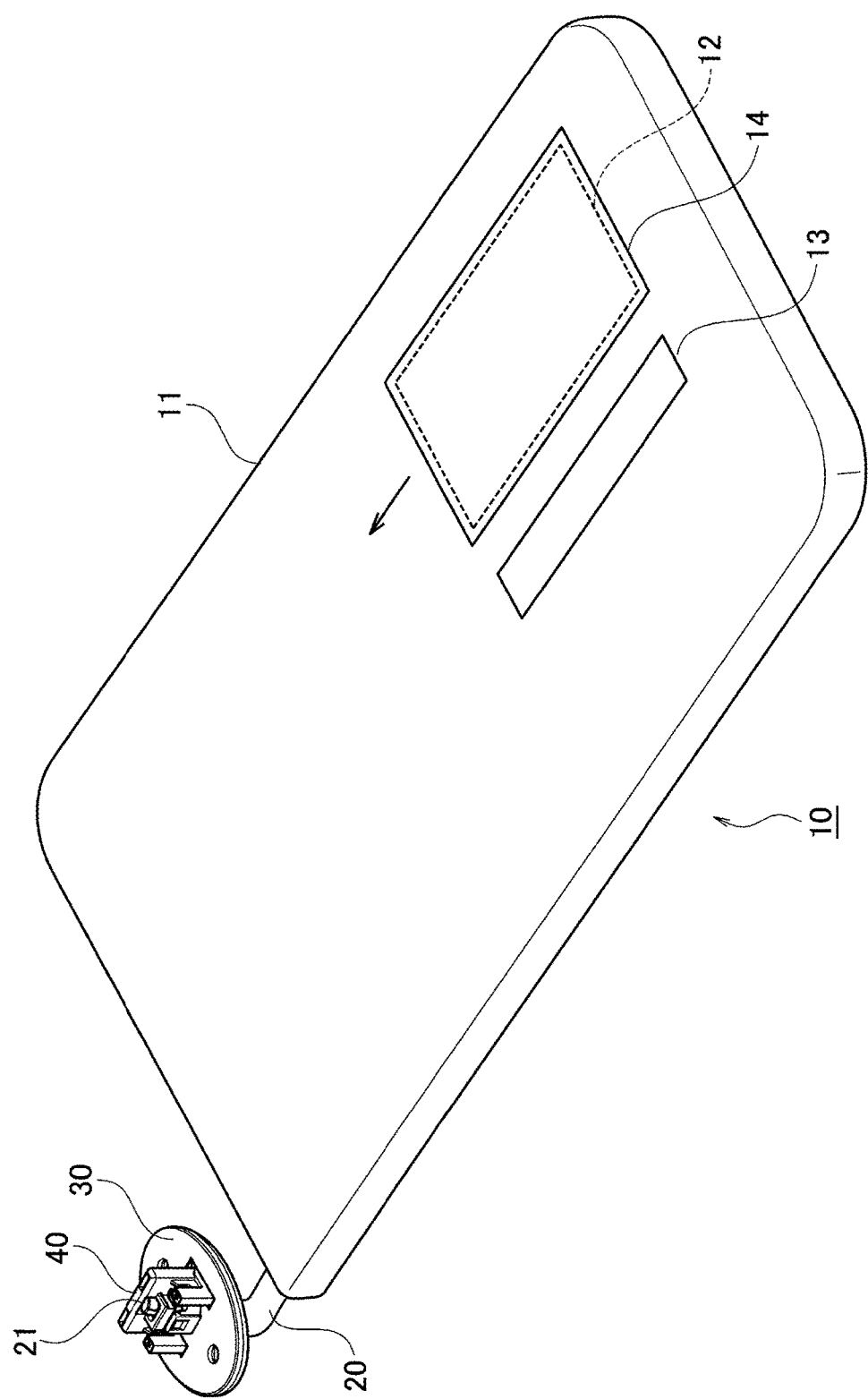
FIG. 1 is a perspective view of a vehicle sun visor according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
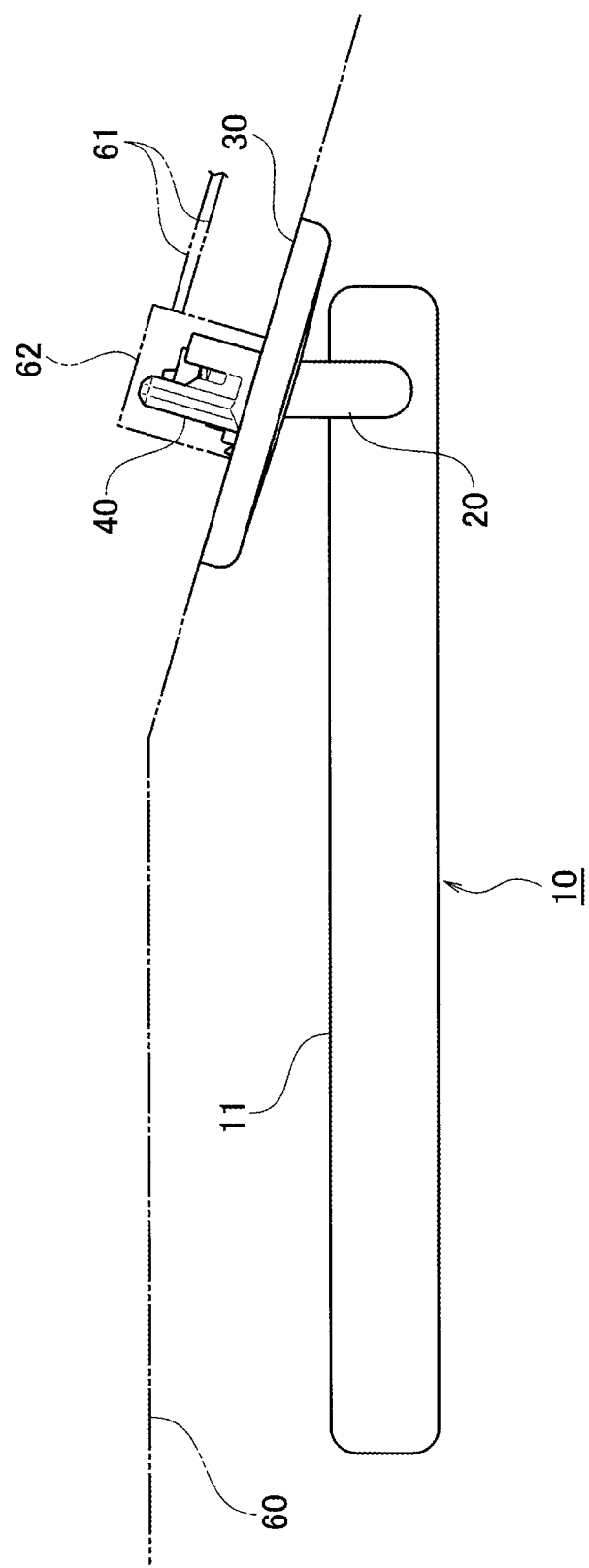
FIG. 2 is a side view showing a state in which the vehicle sun visor is stored toward a ceiling of a cabin.
Figure 3:
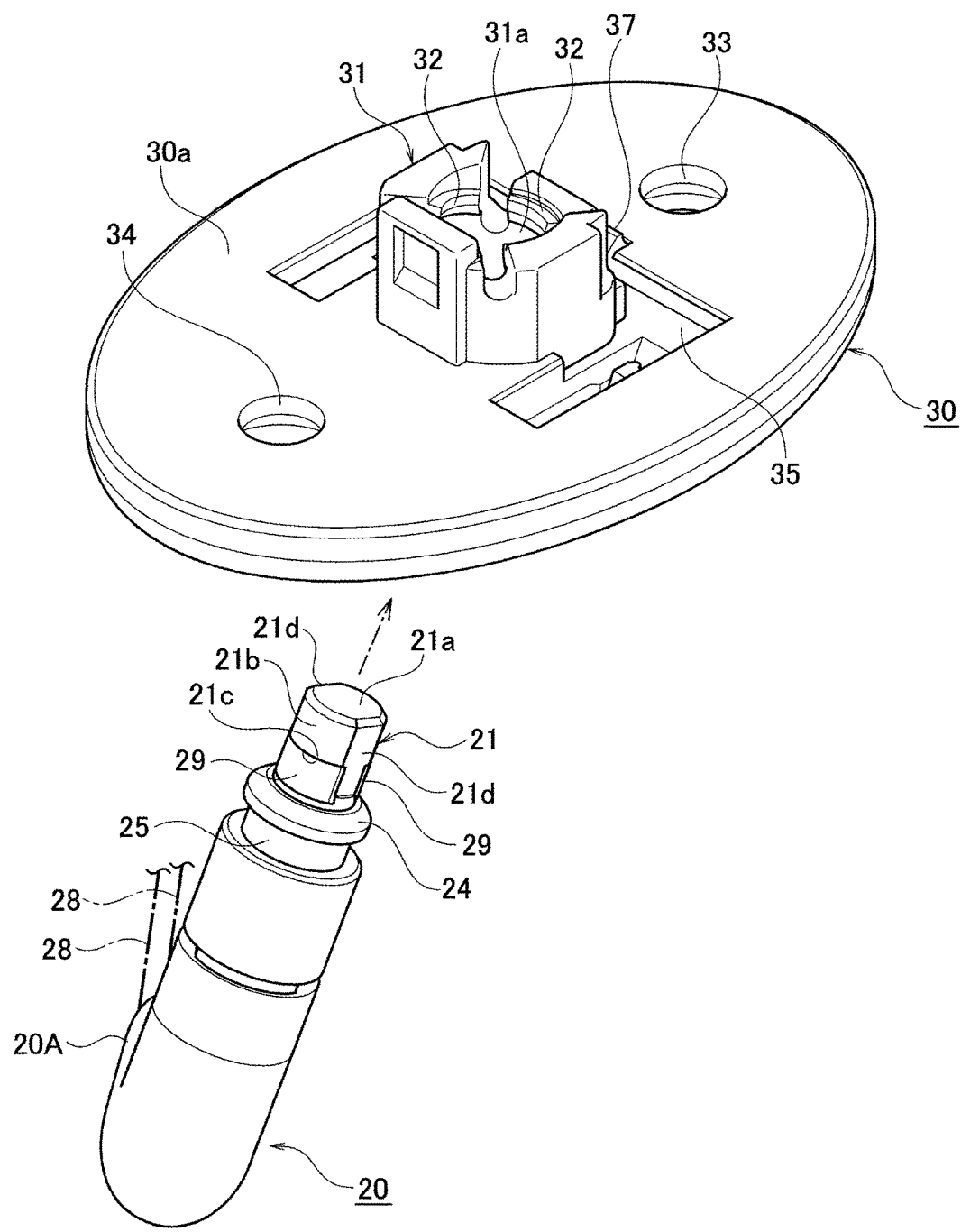
FIG. 3 is a perspective view showing a state before the cylindrical-end portion of an arm is press-fitted to a mounting bracket of the vehicle sun visor.
Figure 4:
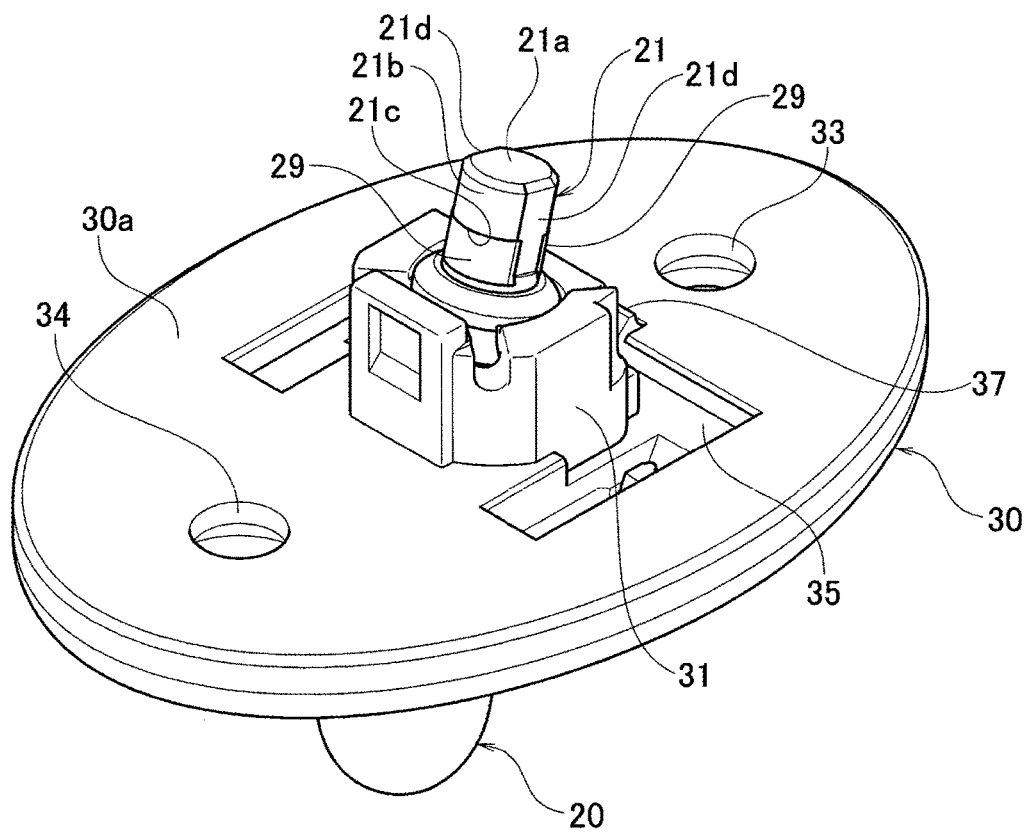
FIG. 4 is a perspective view showing a state in which the cylindrical-end portion of an arm has been assembled to the mounting bracket.
Figure 6A:
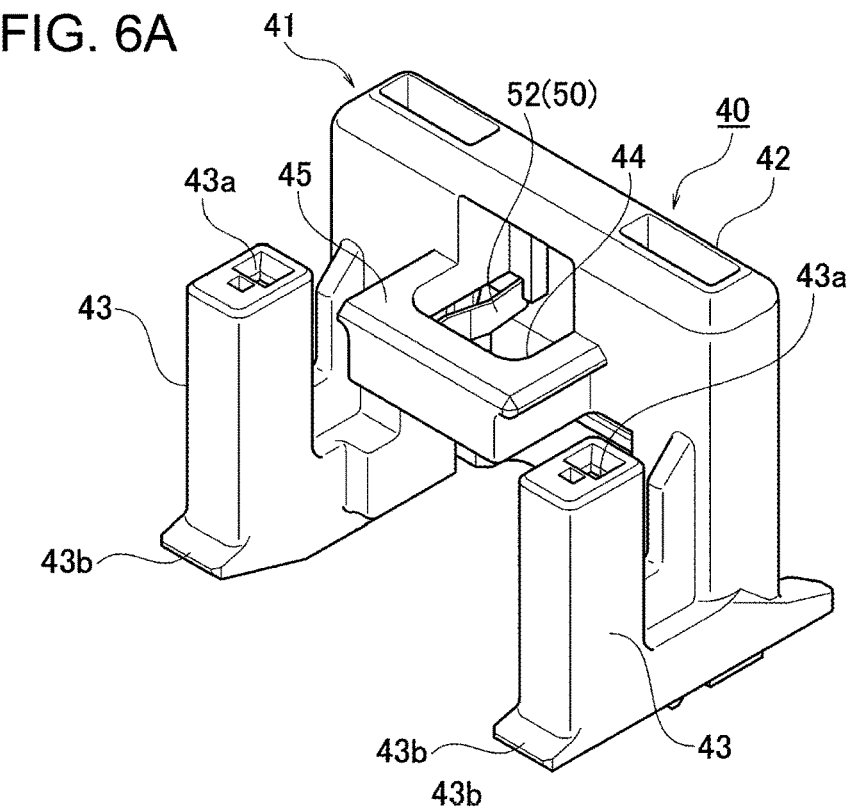
FIG. 6A is a perspective view showing a state in which a pair of terminals has been assembled to the housing of the connector.
Figure 6B:
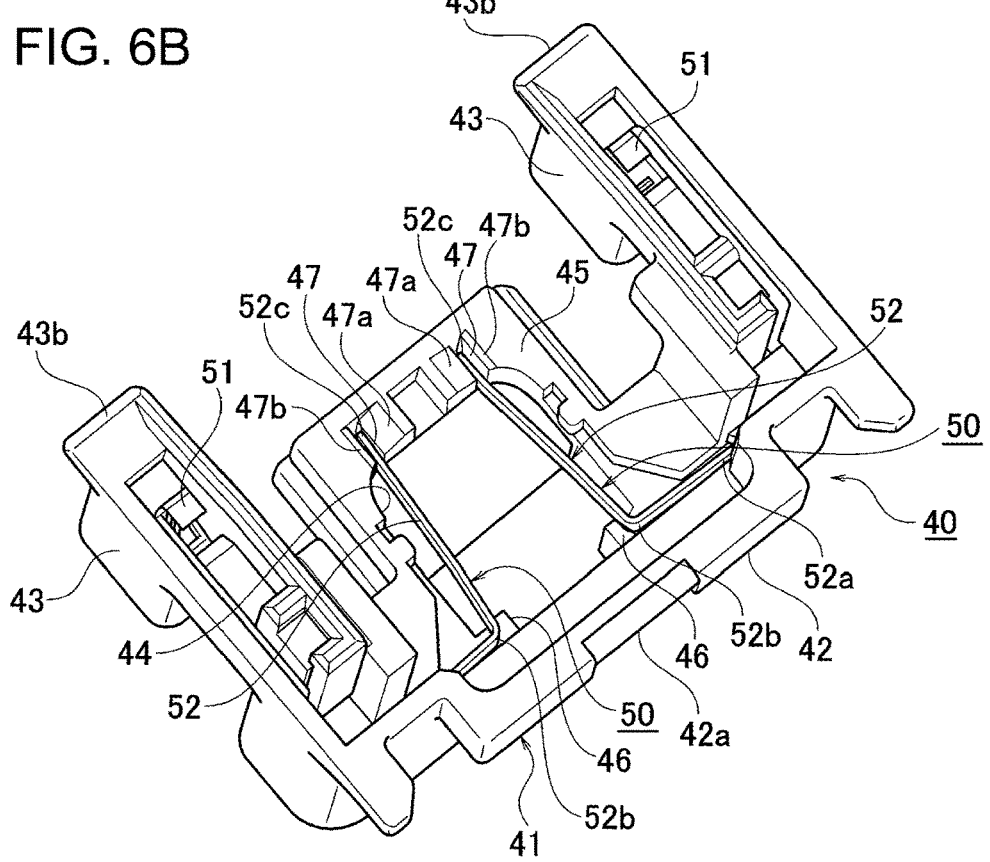
FIG. 6B is a perspective view of the state in which the pair of terminals has been assembled to the housing of the connector as viewed from the bottom.
Figure 7A:
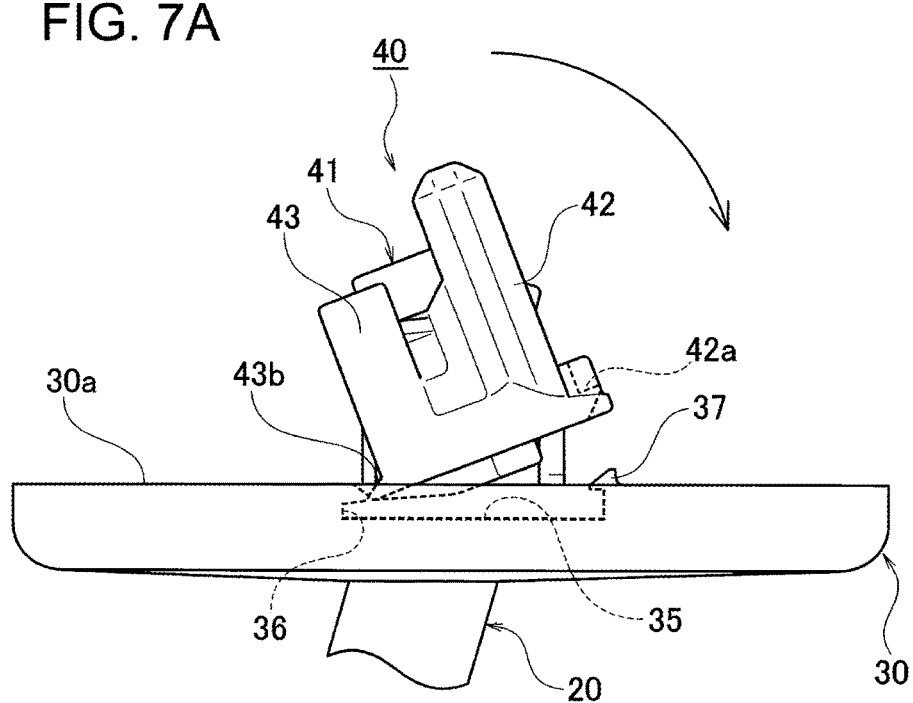
FIG. 7A is a side view showing a state in which the connector is being assembled to the mounting bracket.
Figure 7B:
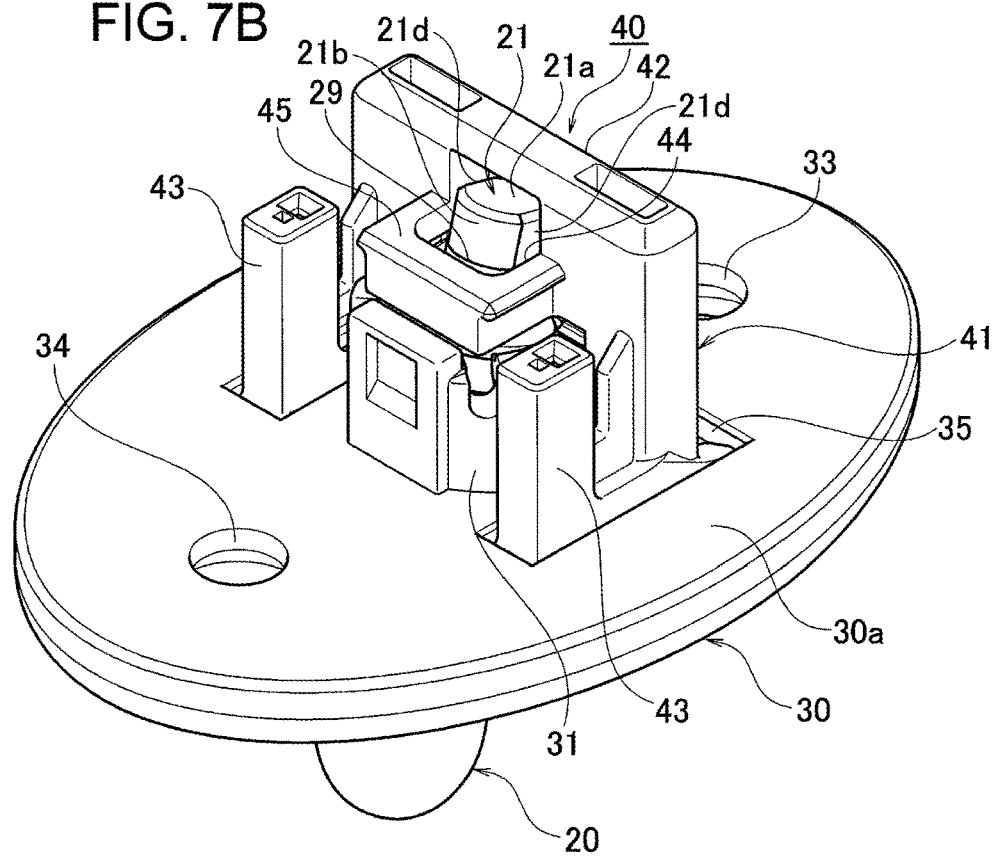
FIG. 7B is a perspective view showing a state in which the connector has been assembled to the mounting bracket.
Figure 8:
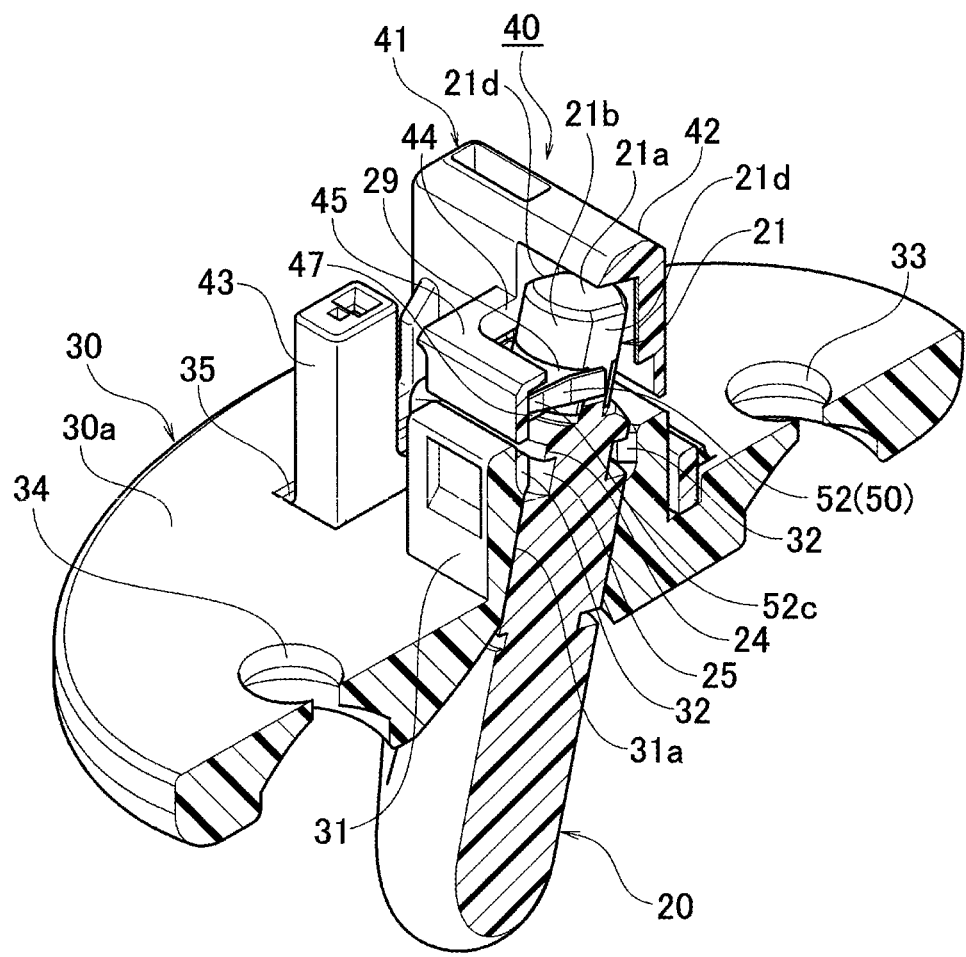
FIG. 8 is a perspective cross-sectional view of a principal part in the state in which the connector has been assembled to the mounting bracket.
Figure 10A:
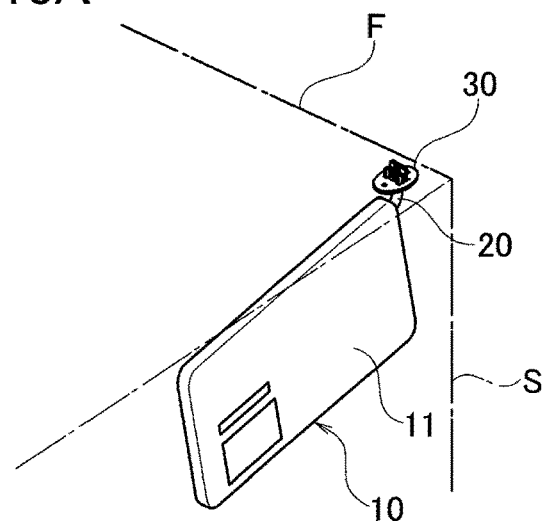
FIG. 10A is a perspective view showing a state in which the vehicle sun visor is folded to the side of a side window.
Figure 10B:
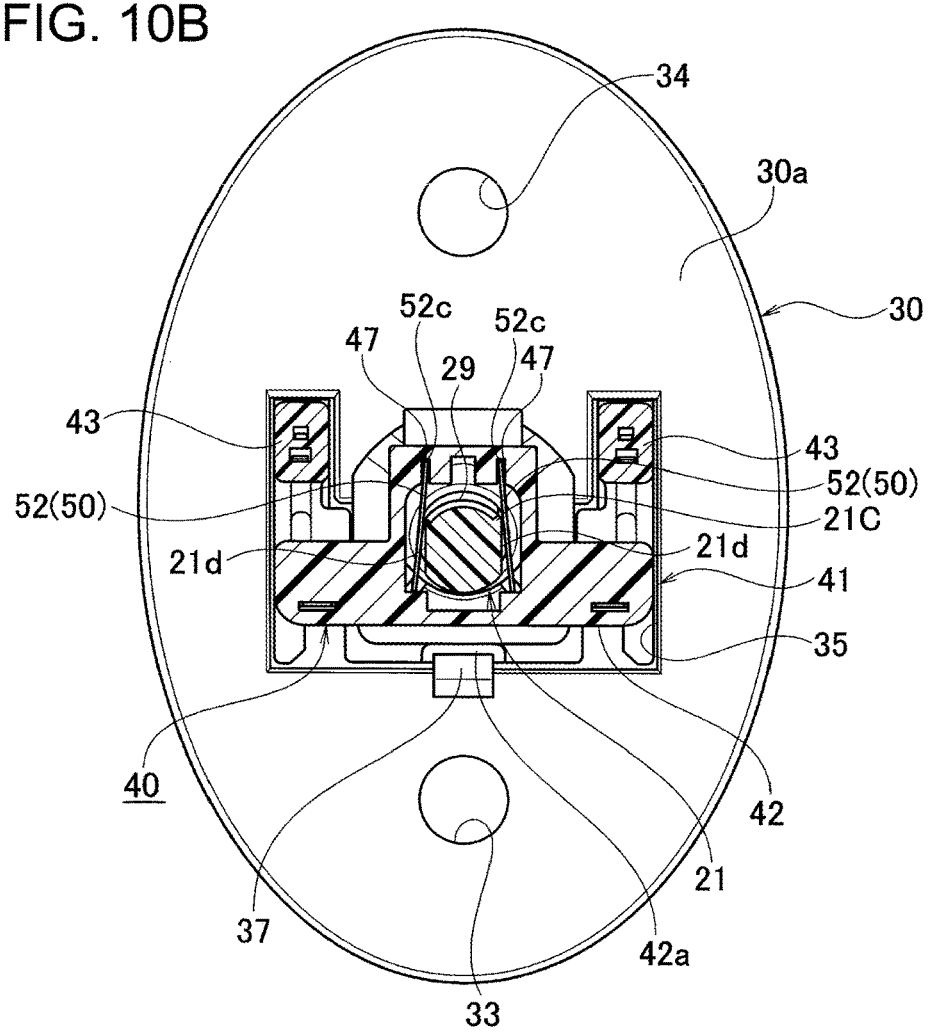
FIG. 10B is a plan cross-sectional view of a principal part of the vehicle sun visor in the above state.
Figure 11:
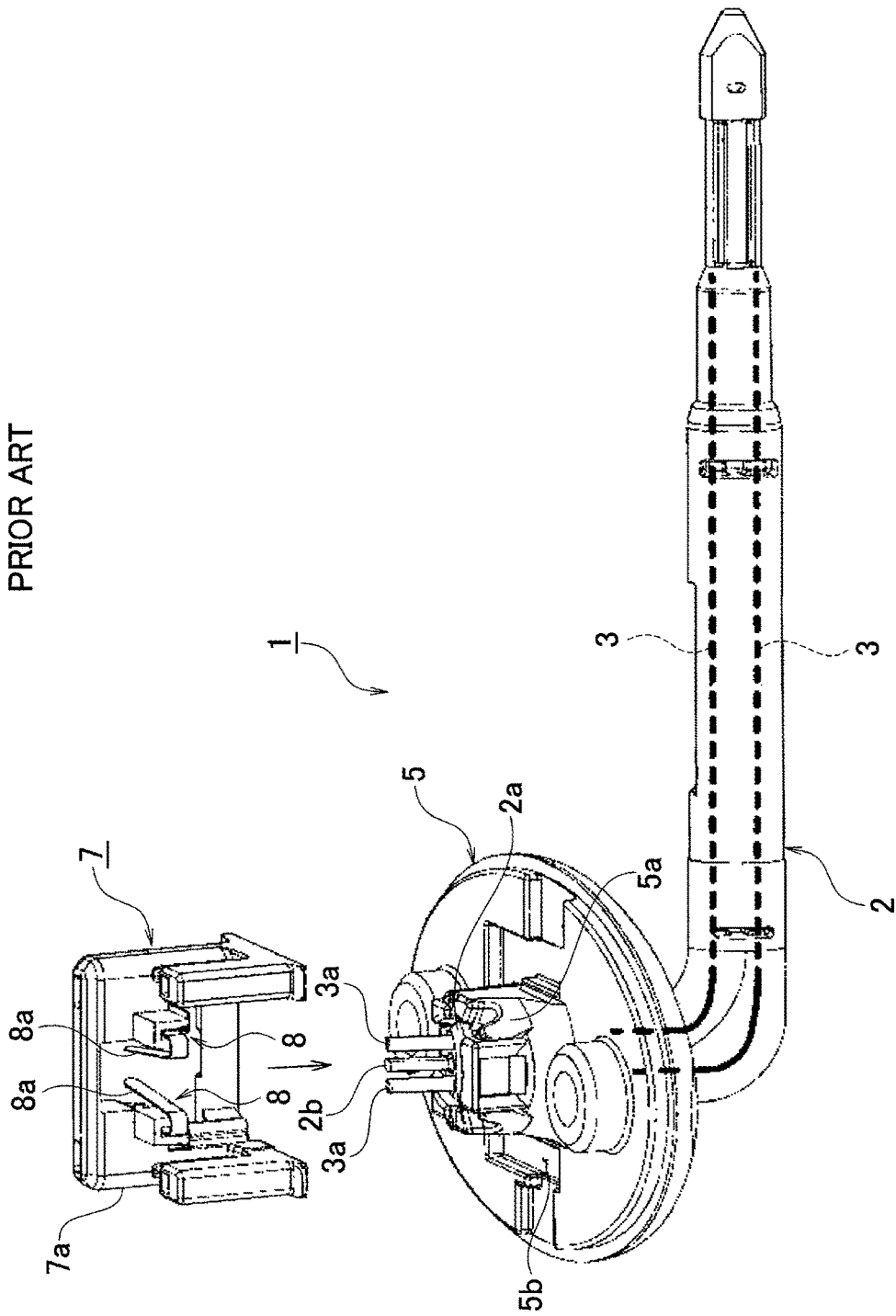
FIG. 11 is a perspective view showing a periphery of a mounting bracket of a conventional vehicle sun visor.

FIG. 1 is a perspective view of a vehicle sun visor according to one embodiment of the present invention, FIG. 2 is a side view showing a state in which the vehicle sun visor is stored on a ceiling of a cabin, FIG. 3 is a perspective view showing a state before the cylindrical-end portion of an arm is press-fitted to a mounting bracket of the vehicle sun visor, FIG. 4 is a perspective view showing a state in which the cylindrical-end portion of an arm has been assembled to the mounting bracket, FIG. 5 is a perspective view showing a state before a pair of terminals is inserted into a housing of a connector of the vehicle sun visor, FIG. 6A is a perspective view showing a state in which a pair of terminals has been assembled to the housing of the connector, FIG. 6B is a perspective view of the state in which the pair of terminals has been assembled to the housing of the connector as viewed from the bottom, FIG. 7A is a side view showing a state in which the connector is being assembled to the mounting bracket, FIG. 7B is a perspective view showing a state in which the connector has been assembled to the mounting bracket, FIG. 8 is a perspective cross-sectional view of a principal part in the state in which the connector has been assembled to the mounting bracket, FIG. 9A is a perspective view showing a state in which the vehicle sun visor is stored toward a ceiling of a cabin, FIG. 9B is a perspective view showing a state in which the vehicle sun visor is folded down in front of a front window, FIG. 9C is a plan cross-sectional view of a principal part of the vehicle sun visor in each of the above states, FIG. 10A is a perspective view showing a state in which the vehicle sun visor is folded to the side of a side window, and FIG. 10B is a plan cross-sectional view of a principal part of the vehicle sun visor in the above state.

As shown in FIGS. 1 and 2, the vehicle sun visor 10 includes a sun visor body 11 having a vanity mirror (makeup mirror) 12 and an illumination lamp (electrical equipment) 13, a non-conductive arm 20 rotatably holding the sun visor body 11 and provided with each contact part 29 of a pair of conductors 28 and 28 at a cylindrical-end portion 21, a mounting bracket 30 for mounting the arm 20 to a roof trim (vehicle) 60, and a connector 40 detachably attached to the mounting bracket 30 and having a pair of terminals 50 and 50 for supplying electric power wherein the terminal has an elastically deforming spring portion (contact part) 52 being in contact with each contact part 29 of the pair of conductors 28 and 28.

As shown in FIGS. 3 and 4, the arm 20 is formed in a cylindrical shape with a synthetic resin. The arm 20 is formed so that the cylindrical-end portion 21 whose upper surface 21a is closed is inclined at a predetermined angle with respect to an arm body 20A. The pair of conductors 28 and 28 extending in parallel is routed inside the arm 20. Each contact part 29 of the pair of conductors 28 and 28 is formed in an arcuate-plate shape wherein the contact part 29 is exposed toward the cylindrical-end portion 21 of the arm 20 and positioned at the cylindrical-end portion 21 (hereinafter referred to as "a pair of arcuate-plate shape contact parts 29 and 29"). Further, an annular recessed groove portion 21c is formed on the lower side from the center of a portion of the outer peripheral surface 21b of the cylindrical-end portion 21 of the arm 20 wherein the portion of the outer peripheral surface 21b is exposed outside an arm-supporting portion 31 of the mounting bracket 30, which will be described later. The pair of arcuate-plate shape contact parts 29 and 29 positioned on the ends of the pair of conductors 28 and 28 is arranged with a pair of cutouts 21d and 21d in the annular recessed groove portion 21c. The pair of cutouts 21d and 21d is formed at a position where the cutouts is away from each other by 180°, and is a non-contact region between the pair of arcuate-plate shape contact parts 29 and 29 and each spring portion 52 of the pair of terminals 50 and 50.

In addition, as shown in FIG. 4, and FIGS. 7A and 7B, when assembling the connector 40 to the mounting bracket 30, each spring portion 52 of the pair of terminals 50 and 50 assembled to the connector 40 passes the vicinity of the pair of cutouts 21d and 21d on the outer peripheral surface 21b of the cylindrical-end portion 21 of the arm 20. That is, the connector 40 can be assembled to the mounting bracket 30 while each spring portion 52 does not contact the pair of arcuate-plate shape contact parts 29 and 29 on the outer peripheral surface 21b of the cylindrical-end portion 21.

Further, as shown in FIG. 3, an annular flange portion 24 is integrally protruded and formed on the lower side of the pair of arcuate-plate shape contact parts 29 and 29 of the outer peripheral surface 21b of the cylindrical-end portion 21. Further, an annular recessed engagement groove (engagement portion) 25 is integrally formed on the lower side of the flange portion 24.

As shown in FIGS. 1 to 4 and FIGS. 7 to 10, the mounting bracket 30 is made of a synthetic resin. A tubular arm-supporting portion 31 having a circular inner peripheral surface 31a rotatably supporting the cylindrical-end portion 21 of the arm 20 is integrally protruded and formed at the center of the mounting bracket 30. As shown in FIGS. 3 and 8, the cylindrical-end portion 21 of the arm 20 is press-fitted to the inner peripheral surface 31a of the arm-supporting portion 31, and a locking protrusion (locking portion) 32 protruding from the inner peripheral surface 31a enters the annular recessed engagement groove 25 of the arm 20, and is engaged with the annular flange portion 24. Accordingly, the upper side of the cylindrical-end portion 21 of the rotating arm 20 protrudes outside the arm-supporting portion 31 such that the upper side is exposed.

As shown in FIGS. 3 and 7A, a recess 35 for assembling the connector is formed on both sides of the arm-supporting portion 31 on the upper surface 30a of the mounting bracket 30 and toward a mounting hole 33 of the mounting bracket 30. An engagement hole 36 into which a locking piece portion 43b of both side walls 43 and 43 of the connector 40 is fitted is formed on both sides of the recess 35 for assembling the connector toward a mounting hole 34, which is opposite the side of the mounting hole 33. In addition, as shown in FIG. 7A, a locking claw portion 37 to which the locking piece portion 42a of a housing body 42 of the connector 40 is locked is formed at the center of the recess 35 for assembling the connector toward the mounting hole 33. The mounting bracket 30 is screwed to a roof trim 60 by screws (not shown) via a pair of mounting holes 33 and 34.

As shown in FIGS. 5 to 6B, a housing 41 of the connector 40 is made of a synthetic resin. This housing 41 includes the housing body 42, a pair of side walls 43 and 43 having a L-shaped terminal receiving chamber 43a on both sides of the housing body 42, and a center wall 45 where a hollow portion 44 is formed between the center wall 45 and the center of the housing body 42. As shown in FIG. 7B, when the housing 41 is assembled in the recess 35 for assembling the connector so that the pair of side walls 43 and 43 of the housing 41 is positioned on both sides of the arm-supporting portion 31 of the mounting bracket 30, the cylindrical-end portion 21 of the arm 20 is exposed in the hollow portion 44 between the housing body 42 and the center wall 45.

As shown in FIG. 5, each terminal 50 whose distal end is a box-shaped terminal connection part 51 is formed in an L-shaped plate shape and housed in the L-shaped terminal receiving chamber 43a of the side wall 43 of the housing 41. In addition, the L-shaped plate spring portion 52 connected to the terminal connection part 51 of each terminal 50 is formed to be elastically deformable. This spring portion 52 functions as a contact portion.

As shown in FIG. 6B, when assembling the pair of terminals 50 and 50 to the connector 40, each base portion 52b of the pair of spring portions 52 and 52 serving as the elastically deforming contact part is fixed to the pair of terminal-fixing portions 46 and 46 which integrally protrudes and is formed on the inner surface of the housing body 42 of the housing 41. Each free end 52c of the pair of spring portions 52 and 52 is supported by a slit (terminal-support portion) 47 integrally formed in a recessed shape on the back side of the center wall 45 of the housing 41 with a state where a tension (load) is applied to the pair of spring portions 52 and 52 in advance. On both sides of each slit 47, a pair of inclined surfaces 47a and 47b for guiding the free end 52c of each spring portion 52 into the recessed slit 47 is formed. Further, the base end portion 52a of each spring portion 52 is held by the housing body 42.

As shown in FIGS. 6A and 6B, each spring portion 52 of the pair of terminals 50 and 50 is positioned in the hollow portion 44 between the housing body 42 and the center wall 45 of the housing 41. The spring portions 52 are arranged opposite to each other.

As shown in FIG. 2, the connector 40 is adapted to be fitted into a connector 62 connected to a power supply connection wire 61 toward the roof trim 60. At the time of this fitting, each terminal connection part 51 of the pair of terminals 50 and 50 of the connector 40 and the pair of terminals (not shown) of the connector 62 toward the roof trim 60 are electrically connected, and electric power is supplied to the pair of terminals 50 and 50 of the connector 40.

Further, as shown in FIG. 9A, when the sun visor body 11 is stored toward the roof trim 60, and, as shown in FIG. 9B, when the sun visor body 11 is folded down in front of the front window F, the pair of arcuate-plate shape contact parts 29 and 29 provided on the outer peripheral surface 21b of the cylindrical-end portion 21 is brought into contact (conducting) with respective spring portions 52 and 52 as contact portion of the pair of terminals 50 and 50 for supplying electric power to be in a conducting (ON) state. Then, the conductive circuit connecting the pair of conductors 28 and 28 routed in the arm 20 and the illumination lamp 13 of the sun visor body 11 is in a conducting state, whereby the lighting preparation state of the illumination lamp 13 of the sun visor body 11 is generated. In this lighting preparation state, when a cover (slide member) 14 covering a vanity mirror 12 of the sun visor body 11 is opened by sliding, the switch mechanism (not shown) is turned on, and the illumination lamp 13 is turned on. Further, as shown in FIG. 10A, when the sun visor body 11 is folded to the side of the side window S, the pair of arcuate-plate shape contact parts 29 and 29 provided on the outer peripheral surface 21b of the cylindrical-end portion 21 is away from each spring portion 52 of the pair of terminals 50 and 50 for supplying electric power to be in a non-conducting state, so that the conductive circuit of the illumination lamp 13 is in a non-conducting (OFF) state.

According to the vehicle sun visor 10 of the embodiment as described above, when the vehicle sun visor 10 is assembled, first, as shown in FIG. 3, the cylindrical-end portion 21 of the arm 20 is press-fitted to a circular inner peripheral surface 31a formed obliquely in the arm-supporting portion 31 of the mounting bracket 30. By this press-fitting, as shown in FIGS. 4 and 8, the locking protrusion 32 protruding from the inner peripheral surface 31a of the arm-supporting portion 31 enters the annular recessed engagement groove 25 of the arm 20, and is engaged with the annular flange portion 24, and the cylindrical-end portion 21 of the arm 20 is rotatably supported on the arm-supporting portion 31.

Next, as shown in FIGS. 5 to 6B, after the pair of terminals 50 and 50 is inserted into the housing 41 of the connector 40, each cutout 21d of the cylindrical-end portion 21 of the arm 20, wherein the pair of arcuate recessed groove portions 22 and 22 is exposed outside the arm-supporting portion 31 of the mounting bracket 30, is positioned to be faced with the both side walls 43 and 43 of the connector 40. In this state, as shown in FIG. 7A, the pair of locking piece portions 43b and 43b provided on the both side walls 43 and 43 of the housing 41 of the connector 40 is inserted into the pair of engagement holes 36 and 36 provided in the recess 35 for assembling the connector wherein the recess is provided on the upper surface 30a of the mounting bracket 30, and the connector 40 is rotated to lock the locking piece portion 42a of the housing body 42 of the connector 40 to the locking claw portion 37 of the recess 35 for assembling the connector, as shown by the arrow in FIG. 7A, so that the connector 40 is attached to the upper surface 30a of the mounting bracket 30.

At this time, as shown in FIG. 8, the pair of spring portions 52 and 52 as the contact parts of the pair of terminals 50 and 50 assembled to the connector 40 passes the vicinity of the pair of cutouts 21d and 21d of the cylindrical-end portion 21 of the arm 20. That is, the connector 40 can be assembled to the mounting bracket 30 without bringing the pair of spring portions 52 and 52 into contact with the pair of arcuate-plate shape contact parts 29 and 29 on the outer peripheral surface 21b of the cylindrical-end portion 21. As a result, there is no interference between the pair of arcuate-plate shape contact parts 29 and 29 and each spring portion 52 of the pair of terminals 50 and 50, and deformation of each spring portion 52 of the pair of terminals 50 and 50 can be reliably prevented.

In addition, the pair of arcuate-plate shape contact parts 29 and 29 is provided so as to be flush with the outer peripheral surface 21b of the cylindrical-end portion 21. Therefore, when the connector 40 is assembled to the mounting bracket 30, even if each spring portion 52 serving as the contact part of the pair of terminals 50 and 50 contacts part of one arcuate-plate shape contact part 29 of the pair of arcuate-plate shape contact parts 29 and 29 on the outer peripheral surface 21b of the cylindrical-end portion 21 of the arm 20, since the pair of arcuate-plate shape contact parts 29 and 29 does not protrude outside the outer peripheral surface 21b, the other arcuate-plate shape contact part 29 and each spring portion 52 of the pair of terminals 50 and 50 do not interfere with each other. Thus, deformation of each spring portion 52 of the pair of terminals 50 and 50 can be reliably prevented.

Further, as shown in FIG. 9A, when the sun visor body 11 is stored toward the roof trim 60, and, as shown in FIG. 9B, when the sun visor body 11 is folded down in front of the front window F, each spring portion 52 of the pair of terminals 50 and 50 of the connector 40 is brought into contact with the pair of arcuate-plate shape contact parts 29 and 29 provided on the outer peripheral surface 21b of the cylindrical-end portion 21 of the arm 20, and the conductive circuit of the illumination lamp 13 is in conductive (ON) state.

At this time, as shown in FIG. 6B, each spring portion 52 of the pair of terminals 50 and 50 serving as the elastically deforming contact part wherein the pair of terminals 50 and 50 is assembled to the housing 41 of the connector 40 is supported at both ends where the spring portion 52 has its base portion 52b which is fixed to the pair of terminal-fixing portions 46 and 46 of the housing body 42, and its free end 52c which is supported by the pair of slits 47 and 47 of the center wall 45, and tension is applied to each spring portions 52 in advance. As a result, the contact pressure (required contact load) can be obtained from the contact start time when each spring portion 52 of the pair of terminals 50 and 50 of the connector 40 contact the pair of arcuate-plate shape contact parts 29 and 29 on the outer peripheral surface 21b of the cylindrical-end portion 21 of the arm 20. Further, when they are in contact, an elastic deforming force is further applied to the spring portions 52 to stabilize the contact state, and the pair of arcuate-plate shape contact parts 29 and 29 on the outer peripheral surface 21b of the cylindrical-end portion 21 of the arm 20 and each spring portion 52 of the pair of terminals 50 and 50 of the connector 40 are not away from each other even temporarily due to vibrations or the like during running of the vehicle. Thus flickering of the illumination lamp 13 at the time of lighting can be reliably prevented.

Further, when the sun visor body 11 is moved from a state where the sun visor body 11 is folded down in front of the front window F as shown in FIG. 9B to a state where the arm 20 is rotated, and the sun visor body 11 is folded to the side of the side window S as shown in FIG. 10A, each spring portion 52 of the pair of terminals 50 and 50 of the connector 40 is away from at least one arcuate-plate shape contact part 29 of the pair of arcuate-plate shape contact parts 29 and 29 provided on the outer peripheral surface 21b of the cylindrical-end portion 21 of the arm 20 as shown in FIG. 10B, and the conductive circuit of the illumination lamp 13 is in non-conductive (OFF) state.

According to the above embodiment, the sun visor body is provided with an illumination lamp as an electrical component. The sun visor body may be provided with a compact and thin liquid crystal monitor or the like as an electrical component.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A vehicle sun visor comprising:
a sun visor body including an illumination lamp;
a non-conductive arm comprising a cylindrical-end portion on which contact parts of a pair of conductors are arranged and rotatably holding the sun visor body;
a mounting bracket configured to mount the non-conductive arm to a vehicle; and
a connector detachably attached to the mounting bracket and including a pair of terminals each having a contact portion to contact with a corresponding contact part of the pair of conductors and configured to supply electric power, wherein
the mounting bracket comprises an arm-supporting portion rotatably supporting a cylindrical-end-portion side of the non-conductive arm,
the contact parts of the pair of conductors are formed in an arcuate-plate shape,
the pair of arcuate-plate shape contact parts is provided with a cutout on an outer peripheral surface of the cylindrical-end portion exposed outside the arm-supporting portion of the non-conductive arm, and
a terminal-fixing portion configured to fix a base portion of each contact portion of the pair of terminals is provided in a housing of the connector, and a terminal-support portion for supporting a free end of each contact portion is provided in the housing of the connector.

2. The vehicle sun visor according to claim 1, wherein when the pair of terminals is assembled to the connector, the terminal-support portion of the housing supports the free end of each contact portion of the pair of terminals with a load applied in advance.

\* \* \* \* \*